Feb. 7, 1939. W. C. SCHERER 2,146,159
BRAKE MECHANISM
Filed Feb. 20, 1934

Inventor
Walter C. Scherer
By
Hardway Cathey
Attorneys

Patented Feb. 7, 1939

2,146,159

UNITED STATES PATENT OFFICE 2,146,159

BRAKE MECHANISM

Walter C. Scherer, Rosenburg, Tex., assignor of one-half to A. B. Segall, Harris County, Tex.

Application February 20, 1934, Serial No. 712,142

1 Claim. (Cl. 188—152)

This invention relates to brake mechanism, and has particular relation to that type of brake mechanism specially adapted for use on motor vehicles.

An object of the invention is to provide auxiliary brakes which will become operative in case the ordinary service brakes fail to operate.

Another object of the invention is to provide, in combination with the hydraulic brake system of a motor vehicle for braking the wheels thereof, an auxiliary hydraulic brake applicable to the driving shaft of the vehicle and which will become operative to brake the vehicle in the event the ordinary brakes fail to operate.

With the above and other objects in view, the invention has particular relation to certain novel features of construction, operation and arrangement of parts, an example of which is given in this specification and illustrated in the accompanying drawing, wherein:

Figure 1 shows a fragmentary plan view of a motor vehicle chassis shown partly in section and equipped with the brakes referred to.

Figure 1:
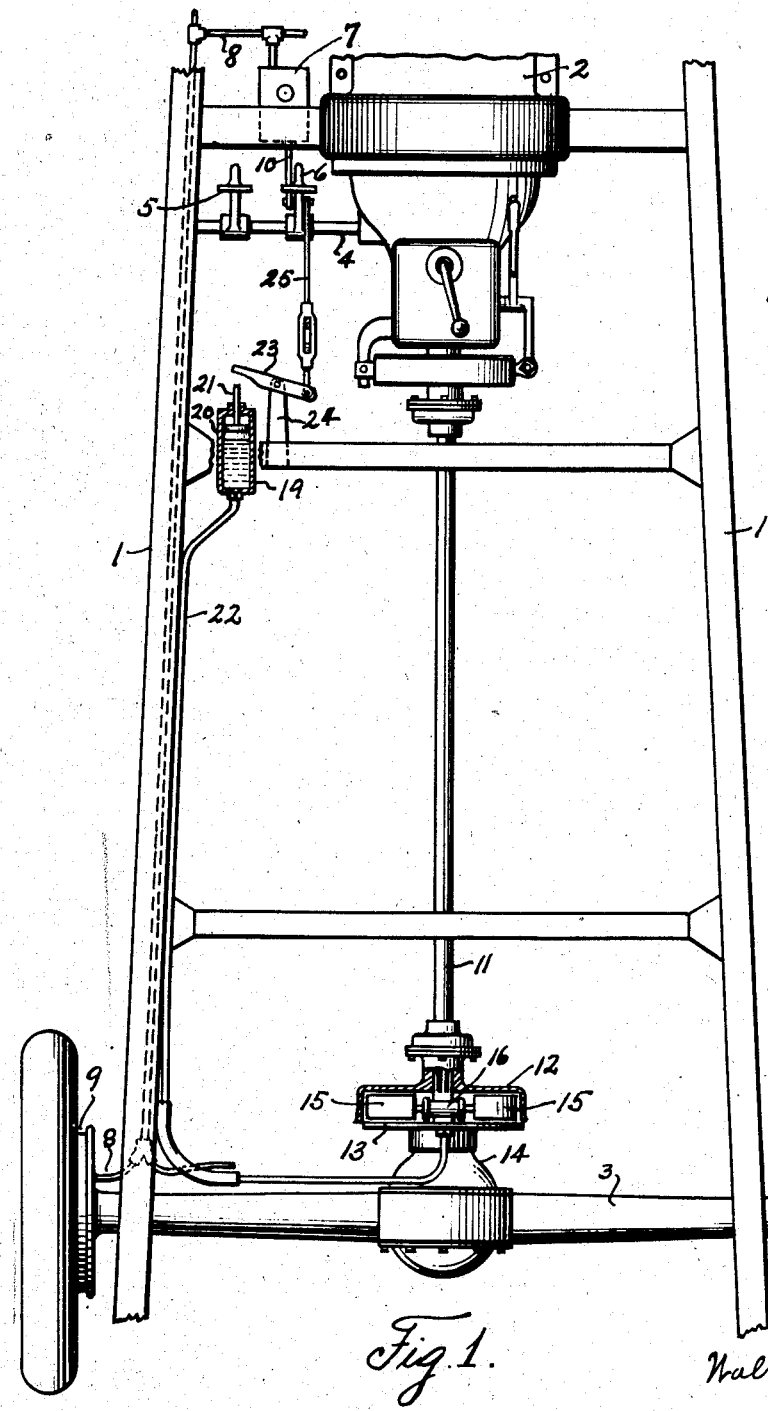
Figure 2:
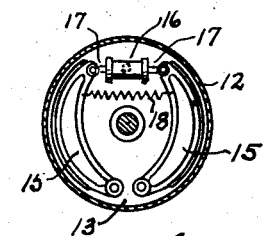
Figure 2 shows a cross sectional view of the auxiliary brake housing showing the brake shoes mounted therein.

Referring now more particularly to the drawing wherein like numerals of reference designate similar parts in each of the figures, the numerals 1, 1 designate the side members of the chassis, the numeral 2 designates the motor and the numeral 3 the rear axle. There is a clutch shaft 4 for operating the clutch and fixed on this shaft is the clutch pedal 5. Loosely mounted on the shaft 4 is the brake pedal 6.

The vehicle is shown as equipped with the ordinary hydraulic brake system. This system includes the cylinder 7 and the piping 8 leads from this cylinder to the conventional hydraulic brakes 9 of the vehicle wheels. The cylinder 7 has the usual plunger which is connected to the brake pedal 6 by the plunger rod 10. When the pedal 6 is depressed the plunger will apply pressure to the brake fluid in the cylinder 7, whereby the wheel brakes will be set.

The drive shaft 11 leading from the motor to the differential of the rear axle has the brake drum 12. The rear side of this drum is closed by a stationary circular plate 13 which is fixed to the differential housing 14. There are the arcuate brake shoes 15, 15, which are pivoted at one end to the plate 13 and whose other ends are free. Between the free ends of the brake shoes there is a cylinder 16 having the usual plungers mounted therein which are connected to the free ends of the brake shoes by means of the plunger rods 17, 17. The brake shoes 15 are normally held out of contact with the brake drum 12 by means of the coil spring 18.

Mounted on the chassis there is the auxiliary cylinder 19 having the plunger 20 therein. A plunger rod 21 is attached to this plunger and works loosely through a bearing at one end of the cylinder 19. Leading from the other end of the cylinder 19 there is a tube 22 which is connected into the cylinder 16 between the plungers thereof. A lever 23 is pivotally mounted on the fulcrum 24 carried by the chassis frame and a link 25 connects the brake pedal 6 with one end of the lever 23. The other end of the lever 23 is opposite the free end of the plunger rod 21.

Figure 3:
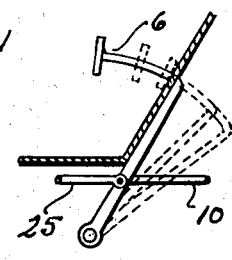
Figure 3 shows a side view of the brake pedal and associated parts.

During the normal operation of the regular brake system upon depression of the brake pedal 6, the brakes will be applied to the wheel drums but the lever 23 will not contact with the plunger rod 21. Should the ordinary wheel brakes fail to operate, as for example for lack of sufficient fluid in the cylinder 7, the pedal 6 will be depressed further to its extreme position as illustrated in Figure 3, and the lever 23 will contact with the plunger rod 21 and place the brake fluid in the cylinder 19 under pressure which will be transmitted to the cylinder 16 and the brake shoes 15 actuated into braking contact with the drums 12 and the auxiliary brake thus applied.

The drawing and description disclose what is now considered to be a preferred form of the invention by way of illustration only, while the board principle of the invention will be defined by the appended claim.

What I claim is:

In a motor vehicle a wheel braking system comprising hydraulic wheel brakes, and means including a manually controlled member for applying an operating fluid to the wheel brakes, a propeller shaft braking system comprising hydraulic propeller shaft brakes mounted on the differential housing of the vehicle, a cylinder containing operative fluid, a pipe leading from said cylinder to the propeller shaft brakes, a plunger in said cylinder and means operatively connected with the manually controlled member effective to actuate said plunger, upon further movement of said manually controlled means, to apply the operating fluid to the propeller shaft brakes to set said brakes.

WALTER C. SCHERER.